J. HALL, Jr.
Potato Digger.

No. 102,813. Patented May 10, 1870.

United States Patent Office.

JOHN HALL, JR. OF TEMPERANCEVILLE, PENNSYLVANIA.

Letters Patent No. 102,813, dated May 10, 1870.

IMPROVEMENT IN AGITATOR-WHEEL FOR POTATO-DIGGERS.

The Schedule referred to in these Letters Patent and making part of the same.

*To all whom it may concern:*

Be it known that I, JOHN HALL, Jr., of Temperanceville, in the county of Allegheny and State of Pennsylvania, have invented a certain new and useful Improvement in Agitator-Wheel for Potato-Diggers; and I do hereby declare that the following is a full, clear, and exact description thereof, reference being had to the accompanying drawing and to the letters of reference marked thereon.

The nature of my invention consists in providing the agitating-wheel of potato-diggers with a compound pivot bearing, constructed and arranged as hereinafter described.

To enable others skilled in the art to make and use my invention, I will proceed to describe its construction and operation.

In the accompanying drawing which forms part of my specification—

Figure 1:
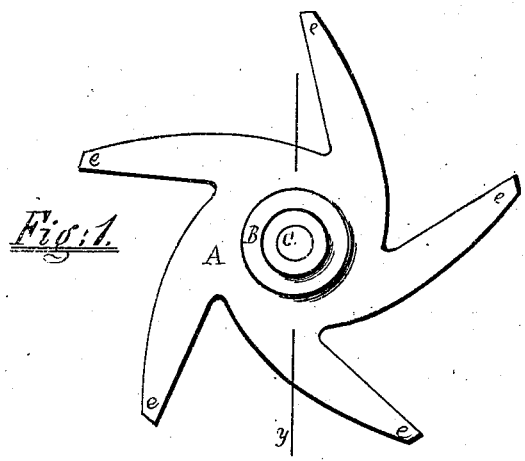
Figure 1 is a side elevation of my improvement in agitating-wheel for the separator of potato-diggers.
Figure 2:
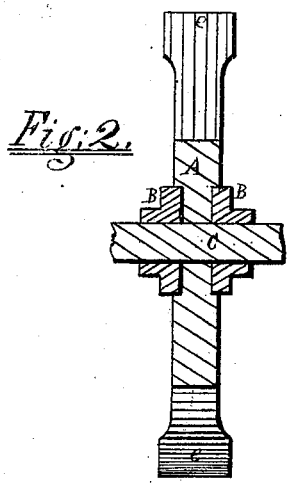
Figure 2 is a transverse section of the same, when cut through at line $y$ of fig. 1.

In the accompanying drawing,

The wheel A is provided with a series of arms $e$, which are used for raising the separator of a potato-digger and allow it to drop suddenly, and thereby separate the earth from the potatoes by the jarring action thus imparted to the separator.

This wheel often becomes inoperative by becoming fixed on its axis, caused by wet earth and weeds getting in and around the axis and in the bore of the hub of the wheel.

To prevent the wheel from becoming fixed on its axis, I have provided the wheel A with hubs B B, which are fitted into a recess made in each side of the wheel, which is so arranged with relation to the hubs B B that it will revolve upon them.

Through the hubs B B and wheel A passes an axle C, upon which they revolve. By thus pivoting the wheel A upon the axle C, the hubs B B will prevent the dirt and other matter from getting into the center bearing of the wheel, and, in case the hubs should become wedged upon the axle C, the wheel A will rotate upon the hubs B B; and, in case the hubs B B should become fixed or wedged in the wheel A, and are loose upon the axle C, then the wheel A and its hubs will rotate together, thus making it almost impossible for the wheel A to ever become inoperative.

Having thus described the nature, construction, and operation of my improvement,

What I claim as of my invention is—

The agitating-wheel for the separator of a potato-digger, with detached hubs, which are so arranged that the hubs and wheels will rotate independently of each other upon the axle C, substantially as herein described and for the purpose set forth.

JOHN HALL, Jr.

Witnesses:
A. C. JOHNSTON,
JAS. G. THOMPSON.